(12) United States Patent
Byrd et al.

(10) Patent No.: US 6,601,979 B1
(45) Date of Patent: Aug. 5, 2003

(54) WHEEL ILLUMINATION DEVICE

(76) Inventors: Ronald L. Byrd, 7806 West 83rd, Bridgeview, IL (US) 60455; Thomas J Noone, 77 Old Oak Trail, Palso Heights, IL (US) 60463

( * ) Notice: Subject to any disclaimer, the term of this patent is extended or adjusted under 35 U.S.C. 154(b) by 0 days.

(21) Appl. No.: 09/561,783

(22) Filed: May 1, 2000

Related U.S. Application Data

(63) Continuation-in-part of application No. 09/241,590, filed on Feb. 2, 1999, now abandoned.

(51) Int. Cl.[7] .............................................. B60Q 1/100
(52) U.S. Cl. ...................... 362/500; 362/193; 362/473
(58) Field of Search ................... 362/473, 474, 362/475, 500, 192, 193, 800, 249

(56) References Cited

U.S. PATENT DOCUMENTS

| 4,383,244 | A | * | 5/1983 | Knauff | 362/500 |
|---|---|---|---|---|---|
| 4,881,153 | A | * | 11/1989 | Scott | 362/500 |
| 5,530,630 | A | * | 6/1996 | Williams, Jr. | 362/500 |
| 5,800,035 | A | * | 9/1998 | Aichele | 362/500 |
| 5,876,108 | A | * | 3/1999 | Chien | 362/500 |
| 6,168,301 | B1 | * | 1/2001 | Martinez et al. | 362/500 |

* cited by examiner

*Primary Examiner*—Sandra O'Shea
*Assistant Examiner*—Peggy A Neils

(57) ABSTRACT

An illumination device and system for illuminating wheels of a motorized vehicle comprising of a wheel-mounted illumination source and a movable contact electrical connector assembly. The movable contact electrical connector assembly comprises of a concentric set of conductive rings insulatedly mounted on the back of the wheel to be in constant movable contact with a corresponding set of electrical contact brushes insulatedly mounted to the vehicle suspension. The concentric conductor rings are connected to the wheel mounted illumination source while the electrical contact brushes are connected to the vehicle's stationary electrical power system. The use of diodes in conjunction with capacitors or by themselves in the electrical circuit of the invention are used to prevent arcing between the brushes and rings during high speed revolutions of the wheel to allow for constant energization and illumination of the invention during high speed operation of the vehicle.

12 Claims, 5 Drawing Sheets

WHEEL ILLUMINATION DEVICE

CROSS-REFERENCE TO RELATED APPLICATIONS

The present application is a continuation-in-part application of the U.S. patent application, Ser. No. 09/241,590 filed Feb. 2, 1999, now abandoned. The Applicants of the present continuation-in-part application claim the benefit of the Feb. 2, 1999 filing date of the U.S. patent application, Ser. No. 09/241,590 pursuant to 35 U.S.C. 120.

STATEMENT REGARDING FEDERALLY SPONSORED RESEARCH OR DEVELOPMENT

Not Applicable.

REFERENCE TO A "MICROFICHE APPENDIX"

Not Applicable.

1. Field of the Invention

The present invention relates to a system for the illuminating of a wheel of a vehicle. In particular, this invention pertains to a modification of the wheel of a vehicle that incorporates an illumination source that moves with the wheel; the utilization of the vehicle's stationarily mounted power supply; utilization of an insulated ground electrical system; utilization of multiple moveable electrical contacts within an insulated ground system to connect the movable wheel illumination source with the vehicle's stationarily mounted electrical power supply; and the utilization of electronic circuitry to prevent reoccurring de-illumination due to electrical arcing occurring within the illumination system when the invention is in use on a vehicle moving at higher speeds.

2. Background

The illumination of automotive wheels for advertising novelty, decoration, safety, and assistance in maintenance has been established from the earliest days of the automobile. Some wheel illumination systems utilize an electrical light or illumination source that was affixed or mounted to the wheel or hub thereby causing the illumination source to move in conjunction with the wheel. These systems used a movable contact electrical connection to provide electrical power from the vehicle's stationarily mounted electrical power supply to the movable illumination source that was wheel or hub mounted. These systems invariably used a common ground by which the illumination source was grounded either through the wheel and/or hub to return the ground through the vehicle's axle and frame to complete the electrical circuit to the vehicle's stationarily mounted electrical power supply.

The movable contact electrical connections used in such inventions generally consisted of a stationary electrical contact brush or ring insulatedly mounted on the vehicle's frame, axle or suspension and a power ring or band insulatedly mounted to move with the wheel itself. The contact brush or ring was electrically connected to the vehicle's stationarily mounted electrical system so as to provide electrical power to the power ring that was in constant moveable contact with the electrical contact brush or ring. The power ring, generally, was insulatedly mounted on the wheel or hub or was mounted between the wheel or hub so as to allow the power ring to turn with the wheel. The power ring, because it was electrically connected to the movable wheel illumination source, transmitted the power from the electrical contact brush or ring to the movable wheel illumination source.

Examples of this type of movable electrical contact connector as used in illumination devices include: Bell, U.S. Pat. No. 3,099,401, which insulatedly mounted a power band on the exterior side rim of a hub-mounted brake drum to be in movable contact with a suspension-mounted electrical contact brush; Brown, U.S. Pat. No. 2,083,514 and Senseman, U.S. Pat. No. 3,340,389, which insulatedly mounted an insulated power ring on the underside of the hub-mounted brake drum to be in movable contact with an electrical contact brush attached to the suspension mounted brake backing plate; Styer et al., U.S. Pat. No. 1,643,593 and Leeman, U.S. Pat. No. 1,539,394, which mounted the power ring on the back of a wooden wheel so as to be in movable contact with an electrical contact brush mounted on the vehicle's suspension.

Other types of movable contact electrical connectors used in wheel illumination devices include, Scott, U.S. Pat. No. 4,881,153, which used an insulating disk that was located in between the wheel and the hub. The insulated disk featured a stationarily mounted electrical power ring and a rotatably mounted electrical contact ring, the power ring being in constant rotateable contact with the contact ring. The contact ring freely rotated on the insulated disk in such a manner as to allow the contact ring to remain stationary in respect to the vehicle while the insulated disk and power ring moved with the wheel.

Williams, U.S. Pat. No. 5,530,630, discloses a wheel illumination device, which in one embodiment for vehicles with hub mounted wheels, (such as trucks and cars), featured a plate that was sandwiched between the wheel and the hub. The plate stationarily mounted a power ring and held it in constant movable contact with an electrical contact brush that was stationarily mounted on the vehicle's suspension. In another embodiment, for use on motorcycles, the device directly affixed the plate to the wheel.

Generally, these wheel illumination devices rely on a common ground electrical system that utilizes a single, insulated, movable, contact electrical connector to provide power from the vehicle's electrical system to the wheel illumination source. While this common ground system used an insulated power lead, it used an uninsulated ground return in which the illumination source is directly grounded to the wheel and/or hub to return the ground through the vehicle's suspension to complete the circuit with the vehicle's stationarily mounted electrical system.

Most modern automobiles no longer use such a common ground electrical power system and instead use the isolated ground electrical power system. The isolated ground system does not allow the ground to be commonly returned through the body of the vehicle, rather, the isolated ground systems use insulated means to transmit the power and to return the ground to the vehicle's electrical power system. The modern automobile relegates the common ground electrical applications to limited applications such as the automotive computer systems that control automotive systems such as ABS braking system, proportional speed control, PTC (power train control), environmental systems, and lights.

The cited prior art also has limited capacity for the illumination design in that the light source is either mounted behind the wheel, to shine between the spokes of the wheels, or it is placed on the exterior of the wheel or hub.

Further, when the brush-ring type electrical connector systems are used, as cited in the wheel illumination inventions above, on motor vehicles traveling at speeds in excess of twenty miles per hour, an undesired, non-continuous illumination of the wheel can occur. This non-continuous illumination is caused when the wheel featuring the brush-ring type connector rotates at a speed sufficient to cause the connector brush to skip or jump out of continuous contact with the conductive rings. The jumping of the brush permits an electrical arcing to occur between the brush and the ring connector; the arcing being caused by the momentary reversal of the electrical flow between the brush and the ring connector when the two are separated. It is believed that this arcing causes an electrical resistance to accumulate within the brush to such a level as to be sufficient to momentarily and completely block the flow of electricity from the brush into the ring connector. The electrical blockage caused by the reoccurring build-up of resistance results in the unwanted, temporary, de-illumination of the wheel. To the observer, this temporary de-illumination of the wheel gives the optical appearance of rotating, broken bands of light instead of the desired continuous circular bands of light.

Further, the arcing that is caused by the momentary separation of the brush connector from the ring connector can cause physical damage to both the brush and ring connector surfaces. This cumulative damage leads to increased wear of the connectors.

SUMMARY OF THE INVENTION

It is a principle object of the present invention to provide an electrical illumination system for vehicle wheels that can provide a wide variety of wheel illumination designs and can be used on nearly any type of wheel.

It is an object of this invention to use an insolated ground electrical system that is compatible with modem automotive electrical systems.

It is another object of the present invention to provide a more reliable illumination system that has greater resistance to dirt, grit and vibration.

It is a further object of the present invention to provide an electrical system that can provide power to a rotating, wheel mounted illumination system from a non-rotating vehicle electrical power source.

It is yet another object of this invention to use an electrical system that will reduce the possibility of interfering with the modem automotive computer system.

It is still yet a further object of this invention to have a system that provides for greater ease in the removal and replacement of the illuminated wheel.

It is another object of this invention to use multiple, movable electrical contact connectors to conduct power from and return the ground to the vehicle to the wheel illumination source that rotates with the wheel.

It is another object of this invention to be able to operate on a vehicle traveling at high speeds.

It is another object of this invention to use circuitry that allows the electrical system of the invention to provide constant and controlled illumination by the invention when the vehicle on which the invention mounted travels at high speed.

It is another object of the invention to use circuitry that will prevent back-arcing between the electrical contacts and compensates for an electrical shortage through the discharge of electricity into the electrical system when a momentary electrical stoppage occurs.

It is another object of the invention to operate on a motor vehicle moving at high speed and to provide constant electrification of the wheel illumination device when the vehicle upon which it is mounted is moving at high speed.

It is an another object of this invention to operate on a motor vehicle at high speed and to provide uninterrupted illumination of the wheel.

It is another object of this invention to provide a means of preventing the reoccurring build-up of electrical resistance within the wheel illumination system.

It is still another object of this invention to prevent electrical arcing from occurring within the wheel illumination system, It is an object of this invention to provide a wheel illumination system that does not fail or break apart when the wheel upon which the invention is mounted rotates at revolutions higher than twenty miles per hour.

It is a further object of this invention to prevent the premature wearing of the electrical connectors of the wheel illumination system.

These and other objects and advantages of the invention will be set forth in the following description and in connection with the accompanying drawings in which like reference characters refer to similar parts through out the several views.

BRIEF DESCRIPTION OF THE DRAWINGS

The novel features that are considered characteristic of the invention are set forth with particularity in the appended claims. The invention itself, however, both as to its structure and as to its operation, together with the additional object and advantages thereof, will best be understood from the following description of the preferred embodiment of the present invention when read in conjunction with the accompanying drawings wherein:

DESCRIPTION OF PREFERRED EMBODIMENTS

While these descriptions directly describe the above embodiments, it is understood that those skilled in the art may conceive of modifications and/or variations to the specific embodiments shown and described herein. Any such modifications or variations that fall within the purview of this description are intended to be included therein as well. It is understood that the description herein is intended to be illustrative only and is not intended to be limitative. Rather, the scope of the invention described herein is limited only by the claims appended hereto.

Figure 1:
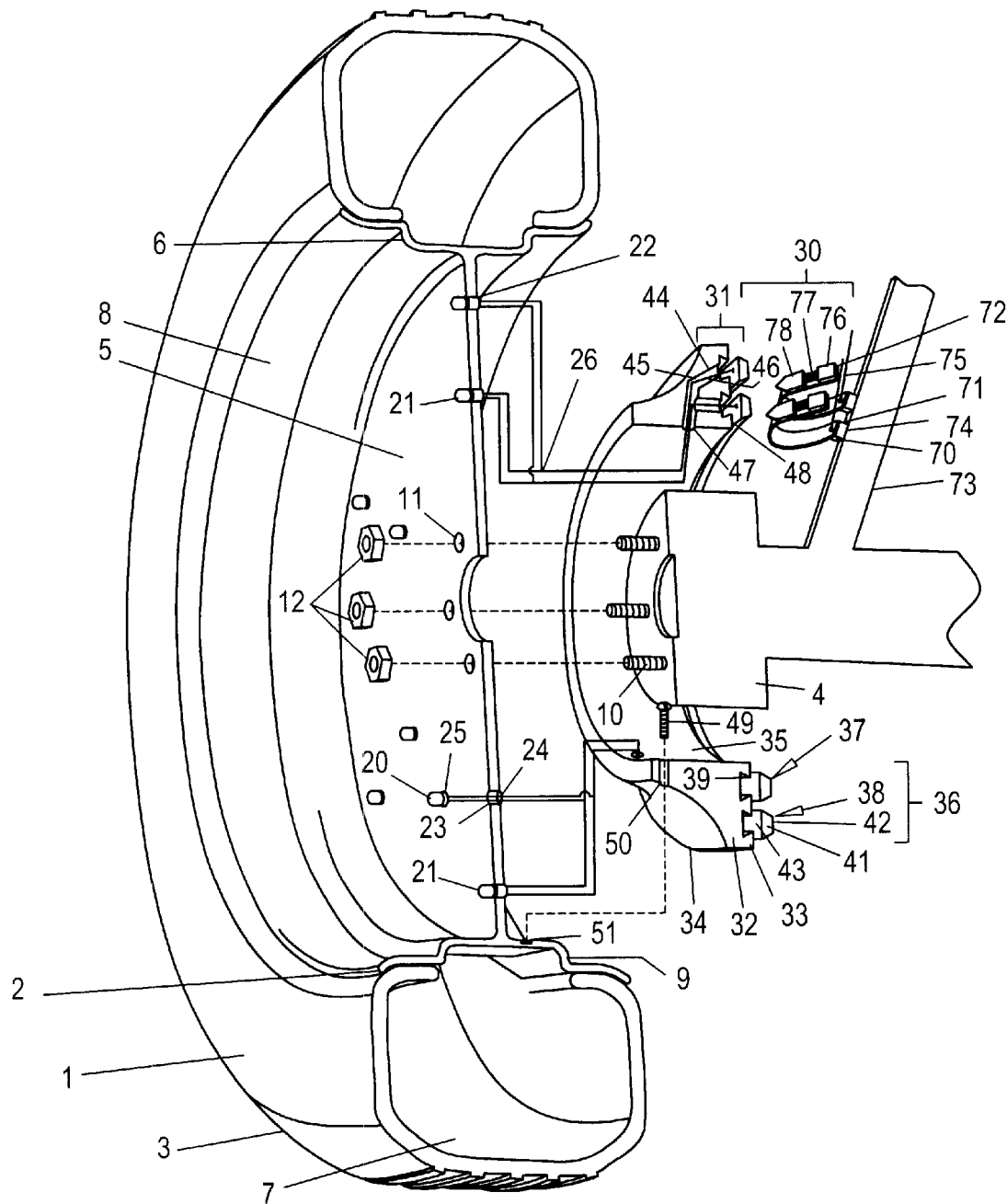
FIG. 1 is a partially cut away, exploded, perspective view of the preferred embodiment of the lighting assembly, ring assembly and contact brush assembly mounted on the vehicle's wheel and suspension.

FIG. 1 shows the preferred embodiment of the attachment of the invention to the wheel and vehicle's suspension. The wheel 1 comprises of a tire 3 that is mounted on a rim 2 affixed to a hub 4 that is rotatably attached to the vehicle.

The rim 2 has a central portion 5 and an outer portion 6. The central portion 5 is used to affix the wheel 1 to the hub 4 and is connected to a outer portion 6 which mounts the tire 3 to the rim 2 to form an airtight compartment 7 that supports the inflation of the tire 3. The rim 2 has a backside 8 that is adjacent to the hub 4 and a frontside 9 that is remote from the hub 4.

The hub 4 has studs 10 which pass through apertures 11 that are radially disposed in the central portion 5 of the rim 4 to attach to nuts 12 that affix the wheel to the hub.

The invention comprises of a lighting assembly 20, an electrical power supply, preferably the vehicle's stationary electrical power supply 80, and an electrical, movable contact connector assembly 30 to connect the vehicle's stationary electrical power supply 80 with the lighting assembly 20.

The lighting assembly 20 is mounted to the wheel rim 2 and rotates with the wheel 1. The lighting assembly 20 comprises of at least one illumination source, an LED 21 in the preferred embodiment, and a mounting conduit 22.

The LEDs 21 are used because they are more resistant to breakage than filament light bulbs when encountering wheel vibration that occurs when the wheel rotates or otherwise moves. LEDs 21 can also supply greater decorative lighting designs, effects and colors since certain types of LEDs 21 are capable of a wide spectrum of alternate illumination schemes based upon variations of construction and alterations of the electrical power.

The mounting conduit 22 passes through the rim's central portion 5 and has a front aperture 23 on the front side 8 of the rim's central portion 5 and a back aperture 24 on the back side 9 of the rim's central portion 5. Each LED 21 is mounted onto one mounting conduit 22 by gluing and inserting the LED's base 25 and electrical contact wires 26 into the front aperture 23 of the mounting conduit 22. The mounting conduit 22 should be of adequate diameter to allow the fitting and attachment of the LED and to allow the LED electrical contact wires 26 to pass through the mounting conduit 22 and out through the mounting conduit's back aperture 24. An appropriate glue or sealant should be used to provide a secure and watertight attachment of the LED 21 to the mounting conduit 22 and secure and seal the LED electrical contact wires 26 at the back aperture 24. The use of water tight seals on the front and rear aperture reduces the possibility that water may enter the mounting conduit 22 through normal use of the wheel and come into contact with the LED electrical contact wires 26 to potentially ground out the electrical circuit of the invention.

The placement of LEDs 21, as shown in the present drawings, demonstrate only one of the many possible LED placement schemes to effect an illumination design. By varying the number, the color, the type and placement of the LEDs 21 on the rim 2, a wide variety of different illumination designs can be achieved on a wide variety of differently designed rims. The two factors limiting the number and placement of the LEDs are the balancing requirements of the wheel 1 and the drilling of mounting conduits 22 that may alter the rim 1's structural integrity. Further, a particular rim design may prevent the use of mounting conduits in the rim's outer portion 6. The absence of the mounting conduits 22 in the rim's outer portion 6 will reduce the risk that the air tight seal within the air tight compartment 7 might lose its integrity and result in a loss of air pressure.

The movable contact electrical connector assembly 30 comprises of a ring assembly 31 and at least two stationary electrical contacts 70. The ring assembly 31, in the preferred embodiment, has an insulation ring 32 that mounts in its topside 33 tow electrically conductive rings 36. The conductive rings 36 are made out of the appropriate electrically conductive metal such as stainless steel. One conductive ring 36 will be a power ring 37 while another conductive ring 36 will be the ground ring 38.

In an alternative embodiment, a single conductor ring replaces the plurality of parallel conductive rings 36. In this alternative embodiment the single brush/conductive ring electrical conductor transmits the power from the invention's power source to the invention's illumination source which is then grounded to the rim 2, thereby allowing the circuit to be grounded through the vehicle's hub and axle and chassis which is connected to the negative source of the invention's power supply.

The insulation ring 32 is constructed from non-electrically conductive material such as plastic. In the preferred embodiment, the insulating ring 32 has a cross-section shape that generally resembles an upside down "L". The foot of the "L" forms the top side 33 of the insulating ring 32 and provides the mounting surface for the conductive rings 36 while the leg of the "L" forms the outer side 34 of the insulating ring 32 that attaches to the outer portion 6 of the rim 21 and an inner side 35 of the insulating ring 32.

The "L" shaped cross section of the insulating ring 32 allows the structure of the insulating ring 32 to make firm contact with the outer portion 6 of the rim 2 when the wheel 1 rotates to create the centrifugal force upon the insulating ring 32.

The top side 33 of the insulating ring 32 and the conductive rings 36 that are mounted on it are generally co-planar with one another and are generally co-axial with the wheel 1. The outer side 34 of the insulating ring 32 is generally a concave surface that is designed to mate with the backside 9 of the outer portion 6 of the rim 2 so as to facilitate the attachment of the ring assembly 31 to the rim 2.

The topside 33 of the insulating ring 32 has concentric channels 39 cut into it to receive and mount the conductive rings 36 in a concentric fashion. The channels 39 and their corresponding conductive rings 36 are made to allow the contours of the channel's walls 44 and bottom 48 to mate with the bottom 43 and sides 41 of the conductive ring 36. Each channel 39 accommodates one conductive ring 36.

In the preferred embodiment, the conductive rings 36 have a generally trapezoidal shaped cross-section whereby the conductive rings sides 41 are inclining and the conductive ring's top 42 and bottom 43 surfaces are in a parallel planar relationship with each other. The walls 44 of the channel 39 match the incline of the conductive ring's sides 41 to form lips which envelope over the conductive ring's sides 41 to hold the conductive ring 36 in place within the channel 39 and to present the top surface 42 of the conductive ring 36 so that it is coplanar with the top surface 33 of the insulating ring 32. In this manner, when the conductive ring 36 is snap-fitted into the channel 39, the walls 44 of the channel will act as lips to hold the conductive ring 36 in place in the channel 39.

In an alternative embodiment, the conductive rings 36 are not snap-fitted into the channels 39 of the insulating ring 32, rather through manufacturing of the insulating ring by injection molding, the insulated ring is made around the conductive rings placed within the injection mold for the insulating ring.

In an alternate embodiment, the walls 44 of the channel 39 and the sides 41 of the conductive ring 36 are not inclined and that other means such as glue, screw, rivets or other type of attachment means are employed to fasten the conductive ring 41 into its channel 39.

The conductive rings 136 and matching channels 39 of the insulating ring are designed to position the conducting rings 36 and the insulating ring 32 as far apart from one another as possible in order to prevent unintended electrical contact between the conductive rings 36.

To connect conductive ring 36 to the light 21, each channel 39 of the insulating ring 32 has at least one electrical conduit 45 drilled through the insulating ring whereby the conduit 45 connects an aperture 46 in the bottom 48 of each channel 39 with an aperture 47 in the insulating ring's inner side 35. The LED electrical contact wires 26 are fed into the inner side aperture 35, passed through the conduit 45 to exit out the channel bottom aperture 46 where the wire 26 is soldered on to the bottom 43 of the conductive ring. In the preferred embodiment, the positive lead of the LED electrical contact wires 26 is connected to the power conductive ring 37 while the ground lead of the LED electrical contact wires 26 is connected to the ground conductive ring 38.

In the preferred embodiment, the insulating ring 32 is permanently affixed into place on to the backside 9 of the rim's outer portion 6 by the use of fasteners 49. These fasteners 49, pass through fastener channels 50 that pass from either the insulating ring's top 33 or the inner side 35 to pass through the insulating ring's curved outer side 34. The fasteners 49 then engage respective openings 50 in the backside 9 of the rim's outer portion 6. These openings 50 do not pass completely through rim's outer portion 6 so as to maintain the airtight compartment 7.

Figure 2:
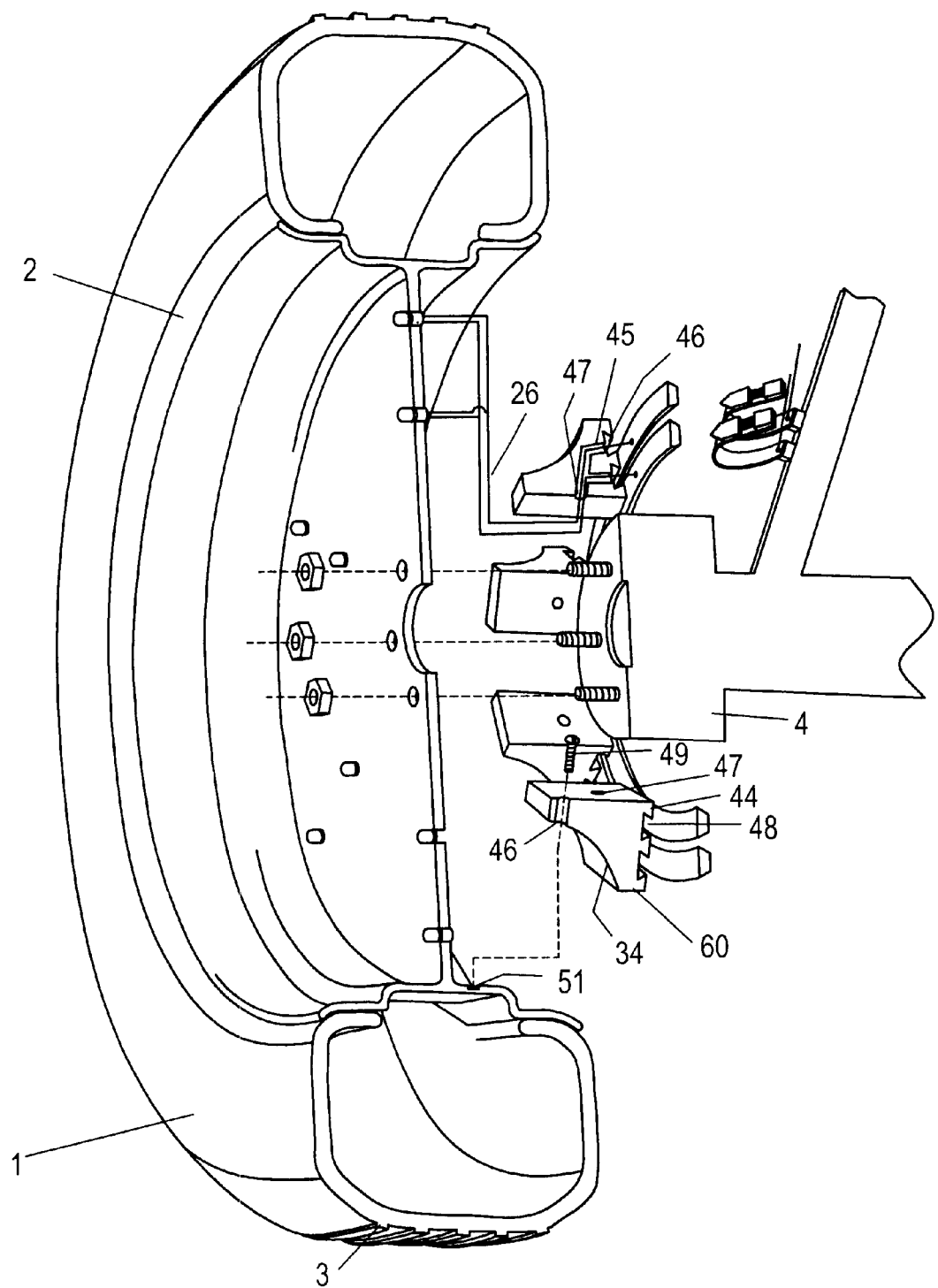
FIG. 2 is a partially cut away, exploded, perspective view of an alternate embodiment of the ring assembly as on the vehicle's wheel and suspension.

In an alternative embodiment, as shown in FIG. 2, insulating clips 60 are used in the place of the insulating ring 32 to hold and mount the conductive rings 36 to the backside 9 of the rim's outer portion 6. These insulating clips 50 have the same crosssection shape, channels 39, electrical conduits 45, and fastener conduits 50 as the insulating ring. The number, size and placement of the clips 60 are adjusted to adequately secure the conductive rings 36 to the rim 1 and to prevent warping of the conductive rings 36 during usage.

In the preferred embodiment as shown in FIG. 1, the stationary electrical contact 70 provides the electrical connection from the vehicle's stationary electrical power supply 80 to the conductive rings 36. In the preferred embodiment, one stationary electrical contact 70 carries the current from the vehicle's stationary electrical power supply 80 to the power ring 37 while another stationary electrical contact 70 returns the ground from the ground ring 38 back to the vehicle's stationary electrical power supply 80.

The stationary electrical contact 70 comprises of a mounting bracket 71 and contact brush assembly 72. The mounting bracket 71 is constructed from spring metal and has a mounting block 73 at one end. The mounting block, made out non-conductive plastic, insulatedly attaches the mounting bracket 71 to a suitable member 74 of the vehicle's suspension such as a upper suspension control arm or attached to the brake backing plate. A wire 75 is attached to and electrically connects the mounting bracket 71 to the vehicle's stationary electrical power supply system 80.

The contact brush assembly 72, which comprises of a contact brush 76, a horse hair brush 77 and stone guard 78, is attached to the other unsecured end of the mounting bracket 71. The contact brush 76 is a block of suitable conductive, wear-resistant metal such as nickel silver or brass. The contact brush 76 is affixed to the bracket so as to be electrically connected to the mounting bracket 71 and to be positioned at the unattached end of the mounting bracket 71. The horse hair brush 77, which is used to clean debris from the conductive ring, is mounted on the mounting bracket 71 next to the contact brush 76.

The stone guard 78 is mounted onto the mounting bracket 71 next to the horse hair brush 77 so as to sandwich the horse hair bush 77 in between the stone guard 78 and the contact brush 72. The stone guard 78 is made from neoprene and is generally block shaped with an end facing away from the horsehair brush 77 that is formed into a point so as to provide a better deflection for stones and debris that are kicked up by the movement of the vehicle's wheel 1.

Figure 3:
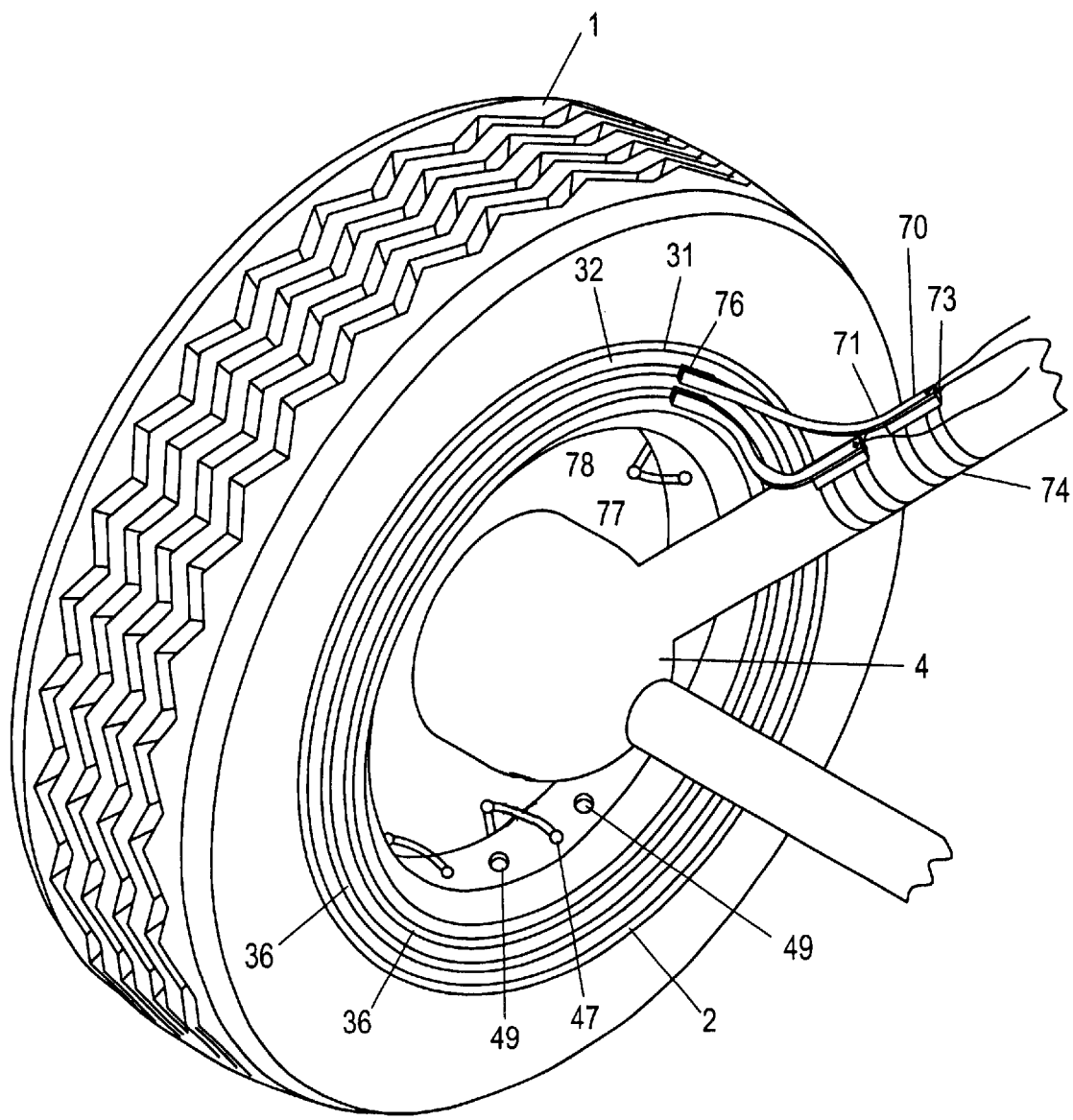
FIG. 3 is a perspective view of the preferred embodiment of the ring assembly mounted on the vehicle's wheel and in contact with a suspension mounted stationary contact assembly.

FIG. 3 shows the mounting bracket 71 is formed to orient the contact brush assembly 72 into contact with the respective conductive rings 36. The spring nature of the bracket insures that the contact brush 76 is in continuous movable contact with its respective conductive ring 36 to provide a constant electrical connection. The mounting bracket 71 is further oriented so as to position the contact brush assembly 72 so that pointed end of the stone guard 78 is positioned to best deflect any stone or larger debris that might ride up on the conductive ring during use or that is kicked up by the wheel. Since the invention uses multiple sets of stationary electrical contacts and respective conductive rings 36, the mounting brackets 71 are formed and positioned to avoid electrical contact with one and another in order to prevent the possibility of a short circuit of the invention.

An alternate embodiment of the invention would have a ring assembly 30 that mounts not just two but several contact rings 36 with respective contact brush assemblies 72 to control different circuits connected to different LEDs 21 within the light assembly 20 so as to provide a greater variety of lighting effects.

Figure 4:
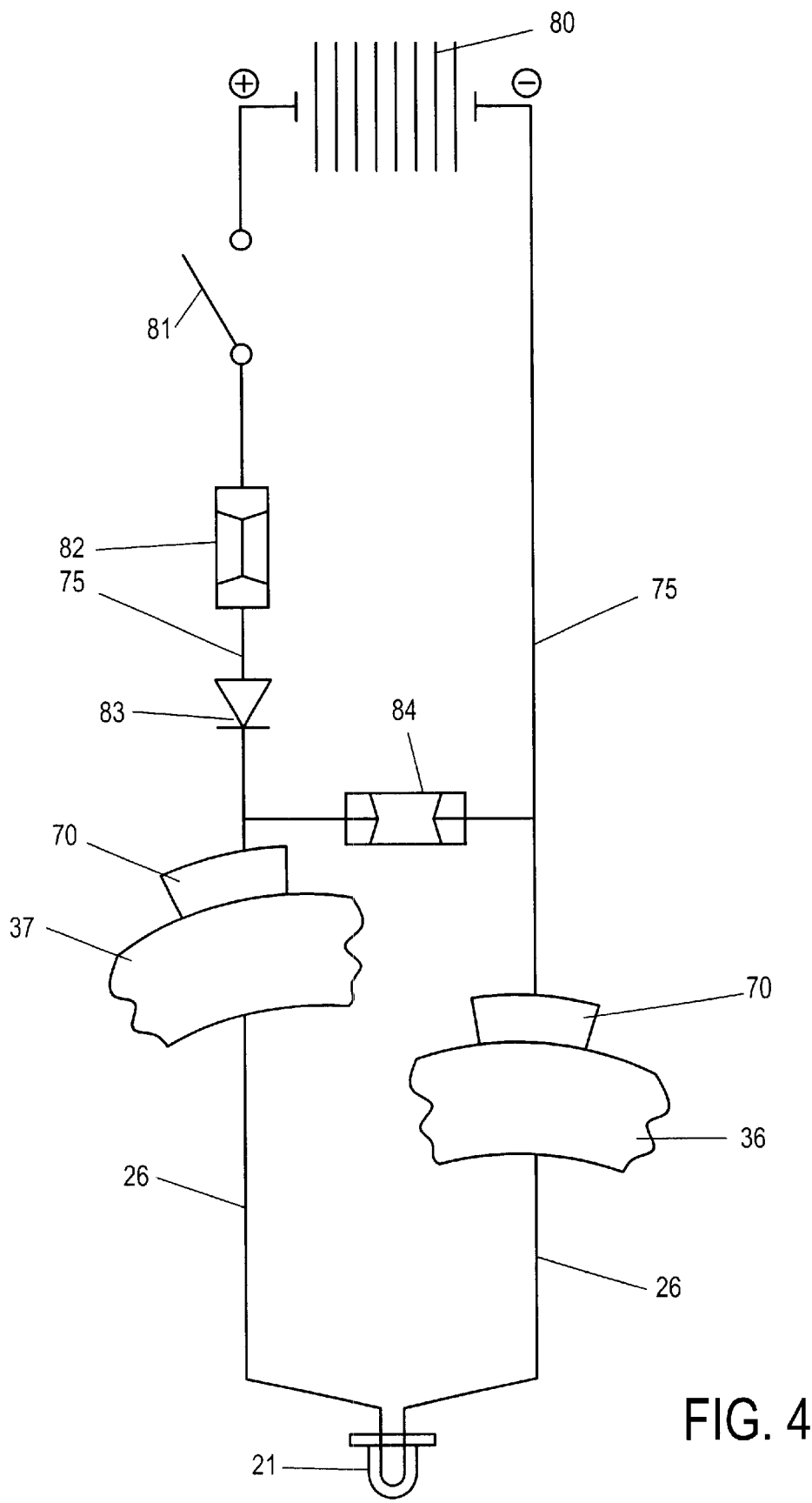
FIG. 4 is the wiring diagram for the present invention.

FIG. 4 shows the electrical circuit for the invention. The vehicle's stationary electrical power supply 80 supplies current to a switch 81. The switch 81 is most suitably mounted to the vehicle so as to be within the control of the vehicle's operator. This switch 81 is able to control the lighting circuit on one or several of the vehicle's wheels. The switch 81 is connected to a short-circuit prevention device 82 such as a relay switch, fuse or circuit breaker. The relays and fuses are to prevent short-circuiting should the power rings/brushes short out due to water contacting them or due to physical damage while the vehicle and the invention are operative.

A wire 75 connects the short-circuit device 82 to the diode 83. The diode 83 prevents the reverse flow of electricity that can occur during high-speed operation when the conductive brush momentarily loses contact with the ring causing a back-arc of electricity. The back-arcing causes an electrical resistance to build within the brush/ring connection. This resistance is understood to cause a reoccurring loss of electrical power to the invention's light source during higher speed vehicular operation. This momentary loss of power/illumination results in an observable development wherein the illumination effect caused by the invention no longer consists of continuous, luminous circles of light but rather undesirable, broken bands of light that appear to rotate.

The diode 83 is connected to a capacitor 84 and to the positive stationary electrical contact 70. The capacitor 84 is also attached to the negative contact wire 75 so that the capacitor 84 is linked in parallel to the negative and positive contact wires 75. When the diode 83 operates to prevent back-arcing within the invention, the capacitor 84 fires, releasing its store of electrical charge into the invention's electrical system. The capacitor's 84 release of its stored electrical charge provides electrical current to power the illumination source of the invention at the moment that the electrical current is disrupted between the power supply 80 and the illumination source. Thus, the capacitor 84 functions to prevent a loss of electricity to the illumination source when the flow of electrical current from the power supply 80 is otherwise interrupted during the operation of the vehicle. The selection of the type and capacity of the diode and the capacitor is easily made by one skilled in the art as determined by the particular needs of the particular electrical system chosen for the powering of the invention.

The diode 83 and capacitor 84 are attached to a stationary contact assembly 70 that passes the current to the positive ring 37. The current flows from the positive ring 37 to the LED 21 by the positive lead of contact wire 26. The negative lead of the contact wire 26 returns the ground from the LED 21 to the ground ring 36. The ground is passed by the ground ring 36 to its respective stationary contact assembly 70. The contact wire 75 from the stationary contact assembly 70 returns to the ground to the vehicle's stationary electrical power supply 80.

The electrical circuit for the invention is also seen as incorporating other electronic components well known in the art that could be used to control the brightness, color, timing, and other lighting effects of the LEDs 21, either individually or collectively. Such an example would use LEDs 21 of varying resistance so that, as the current is increased, the number of LEDs 21 are lighted in a different sequence.

The electrical circuit for an alternative embodiment of the invention could use just one ring/brush electrical contact for the supply of electricity to the illumination source of the wheel. This would allow the illumination source to be grounded to the wheel, thereby allowing the ground to be made and returned through the rim 2 to the axle into the chassis/body of the vehicle which is connected to the power supply 80. In this embodiment, the capacitor 84 would be grounded into the suspension or chassis.

An alternative embodiment for the electrical contact assembly, uses a spring loaded electrical brush instead of the brass contact block. In this form, the electrical contact wire 75 from the vehicle's electrical power system connects directly to the spring-loaded electrical brush. The mounting bracket 71 can therefore be stationarily mounted to vehicle without the need for a neoprene insulated mounting block or similar concern for contact with other mounting brackets.

Figure 5:
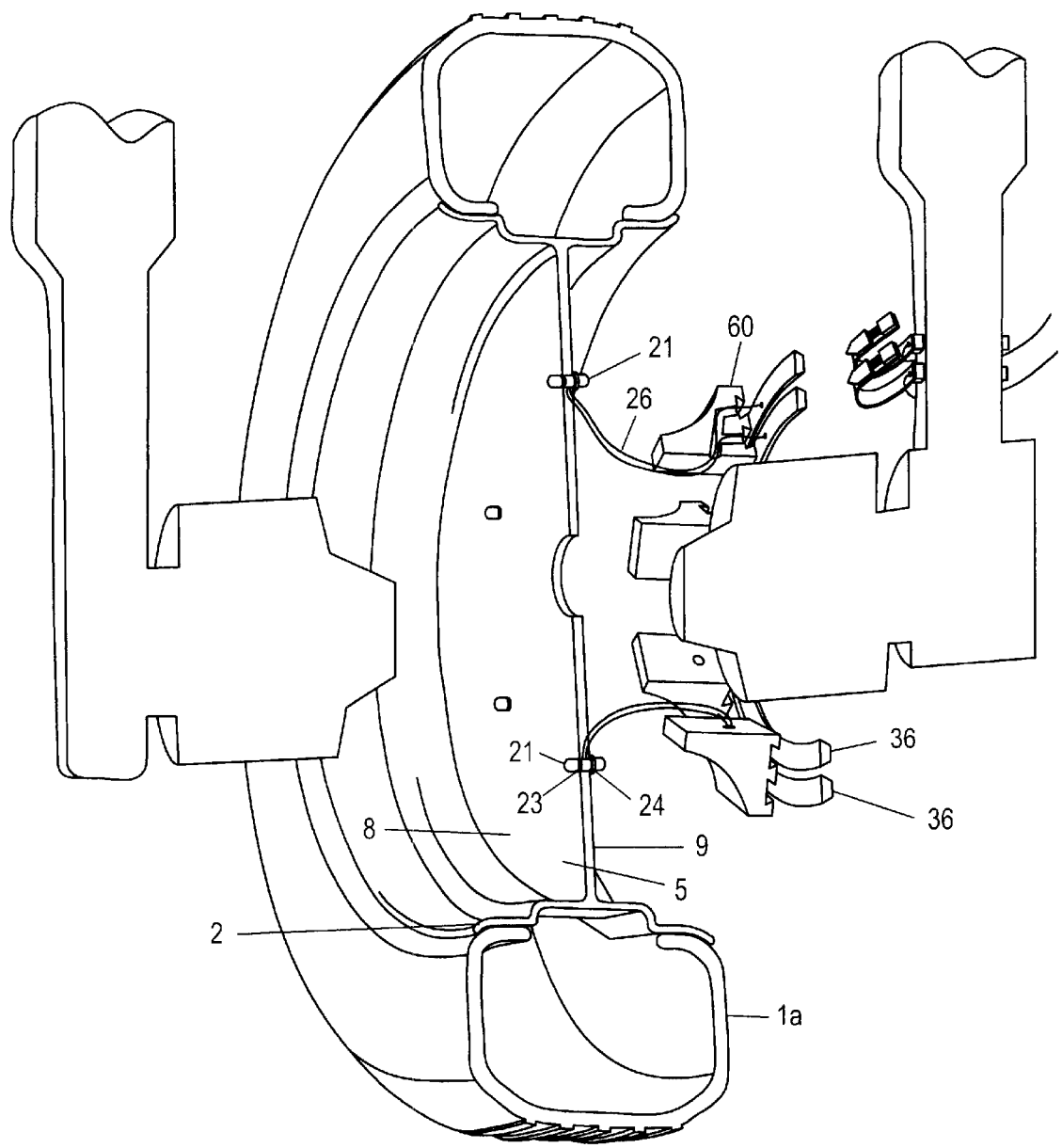
FIG. 5 is a partially cut away, exploded, perspective view of an alternate embodiment of the invention as mounted on a motorcycle wheel and suspension.

As shown in FIG. 5, another embodiment for the invention allows for the invention to be deployed on motorcycle wheels. In this embodiment, the invention is modified to allow LEDs 21 to be used on both the front side 8 and backside 9 of the central portion 5 of the rim 2. The mounting conduits 22 are drilled through the central portion 5 of the motorcycle wheel la as they are with the automotive-truck wheel 1. An LED 21 is mounted in both front apertures 23 and back apertures 24 of the mounting channel. The rear aperture 24 is of sufficient diameter to allow the base 25 of LED to be mounted so as to allow the passage of the LED contact wires 26 of the front and rear LEDs 21 to pass through to the back side 9 of the rim 2. The LED contact wires 26 are then connected to the conductive rings 26. In the preferred embodiment, the mounting clips 60 are used instead of the insulating ring 32 to hold the conductive rings 36 in place on the motorcycle wheel.

What is claimed is:

1. A vehicle wheel illumination apparatus for mounting on the wheel of a vehicle that is comprised of a tire mounted on rim, the wheel being rotatable with respect to a non-rotating portion of the vehicle, one wheel hub and a source of electrical power stationarily mounted to the vehicle, said apparatus comprising of:

a wheel rim having an outer and central portions in said outer portion attaches to the tire to form an airtight compartment that supports the inflation of the tire and is attached to the central portion that supports the outer portion while mounting the rim onto the wheel hub, both the outer and central portions of the rim having a backside that is adjacent to the wheel hub and a front side that is remote from the wheel hub;

a plurality of electrically conductive rings which are rotatable with the wheel;

a mounting device for insulatedly attaching the plurality of electrically conductive rings to the backside of the wheel rim so that the plurality of ring are generally coaxial with the wheel rim;

an illumination device electrically connected to the plurality of electrically conductive rings; and a plurality of stationary electrical contacts mounted on the vehicle frame, with the at least two stationary electrical contacts connected to the power source and in continuous contact with the plurality of conductive rings.

2. The wheel illumination apparatus of claim 1 wherein a diode is connected in series to the power source and conductive rings.

3. The wheel illumination apparatus of claim 1 wherein a capacitor is connected in parallel to the power source and the conductive rings.

4. The wheel illumination apparatus of claim 1 wherein the mounting device is an insulting ring that has a top with a plurality of channels that are concentric, continuous, ring shaped, and share a common axis with the insulating ring.

5. The wheel illumination apparatus of claim 4 wherein each concentric channel has sides and a bottom that are contoured to the sides and bottom of the conductive rings so as to hold the conductive rings in a force fit.

6. The wheel illumination apparatus of claim 4 wherein each channel receives and mounts said respective conductive ring so as to present the top of said conductive ring in a coplanar relationship with the surface of the top of the insulating ring.

7. The wheel illumination apparatus of claim 6 wherein the channel has sides that incline to fold over to restrain the sides of the received conductive ring.

8. The wheel illumination apparatus for lighting a wheel of a cycle that is rotatable with respect to a nonrotating portion of the cycle, and a source of electrical power stationarily mounted to the cycle and one wheel hub, said apparatus comprising of:

a wheel rim having an outer and central portions in which said outer portion attaches to the tire to form an airtight compartment that supports the inflation of a tire and is attached to the central portion which supports the outer portion while mounting the rim onto the wheel hub, both the outer and central portions of the rim having a backside that is adjacent to the wheel hub and a front side that is remote from the wheel hub;

a plurality of electrically conductive rings which are rotatable with the wheel, the rings being mounted on an insulating ring affixed to the backside of the outer portion of the wheel rim;

LEDs electrically connected to the plurality of electrically conductive rings and with at least one LED mounted on each side of the central portion of the wheel rim; and the plurality of stationary electrical contacts mounted on the cycle frame connected to the power source and in continuous contact with a plurality of conductive rings to electrically connect the LEDs to the source of electrical power.

9. The wheel illumination apparatus of claim 8 wherein the plurality of electrically conductive rings have an electrically conductive ring which is a power ring and another electrically conductive ring which is the ground ring.

10. The wheel illumination apparatus of claim 8 wherein the plurality of stationary electrical contacts have one stationary electrical contact conducting power from the power source and a second stationary electrical contract returning the ground to the source of electrical power.

11. The wheel illumination apparatus of claim 1 wherein the plurality of electrically conductive rings have an electrically conductive ring which is a power ring and another electrically conductive ring which is the ground ring.

12. The wheel illumination apparatus of claim 1 wherein the plurality of stationary electrical contacts have one stationary electrical contact conducting power from the power source and a second stationary electrical contract returning the ground to the power source.

\* \* \* \* \*